J. C. H. BROWN.
Chimney-Tops.
No. 145,621.  Patented Dec. 16, 1873.
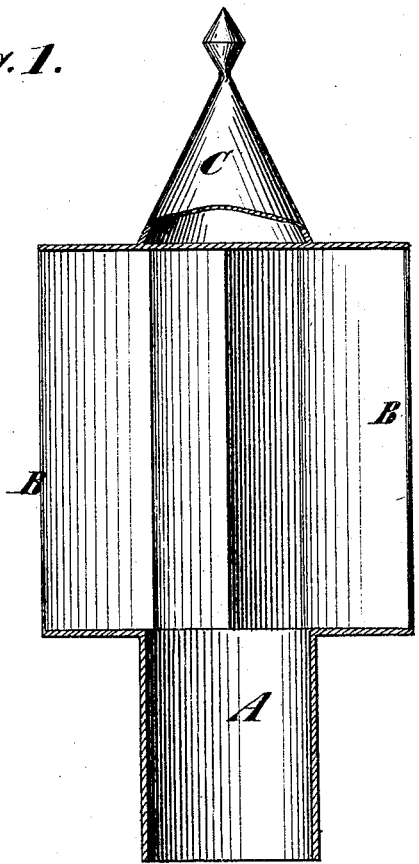
*Fig. 1.*
*Fig. 2.*
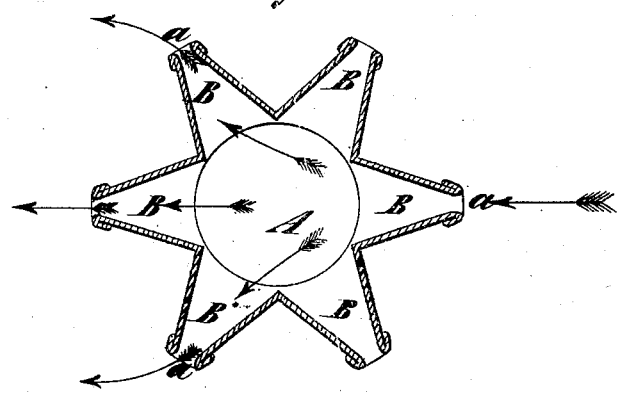
Witnesses.
John Becker
Fred Haynes
J. C. H. Brown
by his Attorneys
Brown & Allen

UNITED STATES PATENT OFFICE.

JAMES C. H. BROWN, OF JERSEY CITY, NEW JERSEY.

IMPROVEMENT IN CHIMNEY-TOPS.

Specification forming part of Letters Patent No. 145,621, dated December 16, 1873; application filed September 2, 1873.

*To all whom it may concern:*

Be it known that I, JAMES C. H. BROWN, of Jersey City, in the county of Hudson and State of New Jersey, have invented a Chimney-Top, of which the following is a specification:

The object of this invention is to produce a chimney-top that will effectually prevent chimneys from smoking. To this end it consists in a chimney top or cap provided with a number of conduits, arranged relatively to each other, so that wind blowing through any one has opportunity to escape from two or more on the opposite side, no matter from which direction the wind blows; and, therefore, no current will descend the chimney, but on the contrary, owing to the free escape of the wind from the chimney-top, a partial vacuum will be created, and thereby an efficient draft will be produced.

In the accompanying drawing, Figure 1 is a central longitudinal section of the improved chimney-cap, and Fig. 2 is a transverse section of the same.

Similar letters of reference indicate corresponding parts in both figures.

A indicates the pipe or tube by which the chimney-cap is secured to the chimney. It is formed on the lower end of the chimney-cap, and communicates with it. The chimney-cap itself consists of a number of laterally extending arms or conduits, B B, constituting the draft openings or orifices. These are very like the arms of a star in shape, but are cut off at the outer ends to form narrow openings or orifices *a a*. They communicate all with an intermediate space, and the points of junction between the several arms are coincident with the inner circumference of the tube A. The arms contract all toward their outer ends, as shown in Fig. 2.

The great difficulty to be overcome in smoky chimneys is to prevent wind from driving down them. This is comparatively easy to effect when the chimney-top is elevated far above all surrounding objects; but when not so situated, wind blowing in gusts, even should it pass by without descending the chimney, is often reflected back from some adjacent obstacle, and then, meeting the original current, they both descend together.

It is this that I design to prevent by my invention, and I accomplish it in a very simple manner. The wind entering any of the narrow orifices *a a* is afforded a chance to expand laterally, and thereby expend some of its force, owing to the enlargement of the arms or conduits toward their inner ends. Besides this, the flaring of the arms inward directs the wind to several of the conduits on the other side of the cap, and therefore this chimney-top affords the wind a much freer egress than ingress, and effectually prevents it from descending the chimney. Consequent upon the free egress that is thus afforded to the wind, a partial vacuum is created over the top of the pipe A, leading from the chimney, and the efficacy of the draft therein is much augmented. Also, the wind by striking the conduit is separated into sheets or stratums, which, by striking the sides of adjacent conduits, is deflected off so as to blow across their mouths, and create a draft within them.

The efficacy of this top is exceedingly great, for there is constantly a draft from all the conduits save the one that happens to be directly into the eye of the wind. A cone-shaped ornament, C, is arranged on the top of the chimney-pot to improve its appearance.

What I claim as my invention is—

A chimney-cap of star-shape in section, having its points radiating from the chimney-flue and contracted toward their outer ends, substantially as and for the purpose shown and described.

JAMES C. H. BROWN.

Witnesses:
EDWIN H. BROWN,
MICHAEL RYAN.